(12) United States Patent
Ashley et al.

(10) Patent No.: US 7,395,424 B2
(45) Date of Patent: Jul. 1, 2008

(54) METHOD AND SYSTEM FOR STEPPING UP TO CERTIFICATE-BASED AUTHENTICATION WITHOUT BREAKING AN EXISTING SSL SESSION

(75) Inventors: Paul Anthony Ashley, Bardon (AU); Sridhar R. Muppidi, Austin, TX (US); Mark Vandenwauver, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 783 days.

(21) Appl. No.: 10/621,927

(22) Filed: Jul. 17, 2003

(65) Prior Publication Data

US 2005/0015594 A1 Jan. 20, 2005

(51) Int. Cl.
*H04L 9/00* (2006.01)
*H04L 9/32* (2006.01)
(52) U.S. Cl. .......................................... 713/156; 726/10
(58) Field of Classification Search ........................ None
See application file for complete search history.

(56) References Cited

U.S. PATENT DOCUMENTS

| 6,094,485 | A | 7/2000 | Weinstein et al. | 380/30 |
| 6,363,478 | B1 | 3/2002 | Lambert et al. | 713/151 |
| 6,367,009 | B1 | 4/2002 | Davis et al. | 713/166 |
| 2002/0029350 | A1* | 3/2002 | Cooper et al. | 713/200 |
| 2002/0091798 | A1* | 7/2002 | Joshi et al. | 709/219 |
| 2002/0166048 | A1 | 11/2002 | Coulier | 713/169 |

(Continued)

FOREIGN PATENT DOCUMENTS

EP 1280317 A 1/2003

(Continued)

OTHER PUBLICATIONS

Wayback Machine article for "Implementing certificate based authentication for remote users with Firewall-1/SecuRemote and openssl as CA," retrieved on Jun. 18, 2007, dated Jan. 26, 2002, retrieved from http://web.archive.org/web/20020126134426/http://www.atsec.com/docs/fw1-openssl.howto.pdf.*

(Continued)

*Primary Examiner*—Nasser Moazzami
*Assistant Examiner*—Brandon S Hoffman
(74) *Attorney, Agent, or Firm*—Hamilton & Terrile, LLP; Gary W. Hamilton (57) ABSTRACT

A method is presented for performing authentication operations. When a client requests a resource from a server, a non-certificate-based authentication operation is performed through an SSL (Secure Sockets Layer) session between the server and the client. When the client requests another resource, the server determines to step up to a more restrictive level of authentication, and a certificate-based authentication operation is performed through the SSL session without exiting or renegotiating the SSL session prior to completion of the certificate-based authentication operation. During the certificate-based authentication procedure, an executable module is downloaded to the client from the server through the SSL session, after which the server receives through the SSL session a digital signature that has been generated by the executable module using a digital certificate at the client. In response to successfully verifying the digital signature at the server, the server provides access to a requested resource.

10 Claims, 5 Drawing Sheets

U.S. PATENT DOCUMENTS

2003/0018886 A1     1/2003    Kuehr-McLauren et al.

FOREIGN PATENT DOCUMENTS

| WO | WO 00/27089 | 5/2000 |
| WO | WO 01/11451 | 2/2001 |
| WO | WO 01/80479 A1 | 10/2001 |
| WO | WO 02/39237 | 5/2002 |

OTHER PUBLICATIONS

Wikipedia reference for Transport Layer Security, retrieved Jun. 19, 2007, http://en.wikipedia.org/wiki/Transport_Layer_Security.*

"DFS as an Internet File System", No. 409114, *Research Disclosure*, p. 625, May 1998.

"A customizable mechanism for generating an X.500 distinguished name, when a client has not presented an X.509 certificate", No. 448125, *Research Disclosure*, p. 1400, Aug. 2001.

"Shared cipher spec protocol", No. 432173, *Research Disclosure*, p. 776, Apr. 2000.

Wen et al., "Attacks on Authentication Protocols with Compromised Certificates and How to Fix Them", *IPSJ Journal*, vol. 41, No. 8, pp. 2110-2120, Aug. 2000.

Hayes, "Restricting Access with Certificate Attributes in Multiple Root Environments: A Recipe for Certificate Masquerading", *17th Annual Computer Science Applications Conf.*, Dec. 10, 2001.

Park et al., "RBAC on the Web by Smart Certificates", *Proceedings of the 4th ACM Workshop on Role-Based Access Control*, pp. 1-9, 1999.

Zhou et al., "COCA: Secure Distributed Online Certification Authority", ACM Transactions on Computer Systems, vol. 20, No. 4, pp. 329-368, Nov. 2000.

Godber et al., "Secure Wireless Gateway", *ACM Workshop on Wireless Security*, pp. 41-46, Sep. 2002.

\* cited by examiner

METHOD AND SYSTEM FOR STEPPING UP TO CERTIFICATE-BASED AUTHENTICATION WITHOUT BREAKING AN EXISTING SSL SESSION

BACKGROUND OF THE INVENTION

1. Field of the Invention

The present invention relates to an improved data processing system and, in particular, to a method and apparatus for multicomputer data transferring. Still more particularly, the present invention provides a method and apparatus for multicomputer communication using cryptography.

2. Description of Related Art

E-commerce web sites and web applications perform transactions over computer networks on behalf of users. A user must often pass through an authentication procedure in order to prove the user's identity to an appropriate level of certainty for security purposes.

Many computer systems have different types of authentication for different levels of security. For example, after a successful completion of a first level of authentication in which a correct username and password combination is provided by a user, a system may provide access to a particular set of resources on a web site. A second level of authentication might require a user to present a hardware token, e.g., a smartcard, after which the user is provided access to more tightly controlled resources on the web site. A third level of authentication might require the user to provide some form of biometric data, e.g., through a fingerprint scan or a retina scan, after which the system provides access to very sensitive or confidential resources on a web site.

The process of moving up from one authentication level to the next level is termed "step-up authentication". In other words, the user steps from one level of authentication up to a higher level as required by a system in order to gain access to more sensitive resources.

In an e-commerce web-based environment, computer systems often implement authentication services as a form of front door or sentry gate for accessing a web site. These authentication services sit in front of applications, i.e. between the user and the applications, to ensure that the user is authenticated before obtaining access to any resources. These authentication services may be implemented as a web server plug-in, a reverse proxy, or other similar technology. A potential problem with these authentication services is that they often use username/password authentication and cannot step up to authentication methods that use client-based certificates. A certificate-based authentication procedure is generally considered to achieve a higher level of security than a username/password-based authentication procedure.

Certificate-based authentication involves the use of public/private asymmetric cryptographic key pairs; a digital certificate binds a certified user's identity with a public cryptographic key. During a certificate-based authentication procedure, the user provides his or her digital certificate to an authentication service, and the user is required to prove that the user has access to a private cryptographic key that corresponds to the public key. For example, the authentication service provides some form of challenge data to the user's client computer, which then signs the challenge data with the user's private cryptographic key, and the authentication service can verify the digital signature with the user's public key. If the authentication service determines that the challenge data was properly signed with the user's private key, then the authentication service has verified the identity of the user to a high degree because the private key should always be kept secret by the user whose identity is stored in the certificate.

The operation of stepping up to a certificate-based authentication procedure is often not possible. A problem typically arises because a mutually authenticated SSL session has already been established between the client and the server for a lower-level of non-certificate-based authentication, such as a username/password combination. If the authentication service that requires the certificate-based authentication procedure does not have control over the SSL stack, which is the case with most commercially available products, e.g., it may be embedded within the operating system in some manner, then the authentication service cannot force the establishment of a new SSL session. Hence, the authentication service cannot step up from a username/password-based authentication procedure that has already occurred over an active SSL session to a certificate-based authentication procedure while maintaining the active SSL session.

Therefore, it would be advantageous to have a method and a system that can step up from a non-certificate-based authentication procedure to a certificate-based authentication procedure without exiting or renegotiating a previously established SSL session in order to obtain a higher level of security that is required by an authentication service for some purpose.

SUMMARY OF THE INVENTION

A method is presented for performing authentication operations. When a client requests a resource from a server, a non-certificate-based authentication operation is performed through an SSL (Secure Sockets Layer) session between the server and the client. When the client requests another resource, the server determines to step up to a more restrictive level of authentication, and a certificate-based authentication operation is performed through the SSL session without exiting or renegotiating the SSL session prior to completion of the certificate-based authentication operation. During the certificate-based authentication procedure, an executable module is downloaded to the client from the server through the SSL session, after which the server receives through the SSL session a digital signature that has been generated by the executable module using a digital certificate at the client. In response to successfully verifying the digital signature at the server, the server provides access to a requested resource.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

DETAILED DESCRIPTION OF THE INVENTION

In general, the devices that may comprise or relate to the present invention include a wide variety of data processing technology. Therefore, as background, a typical organization of hardware and software components within a distributed data processing system is described prior to describing the present invention in more detail.

Figure 1A:
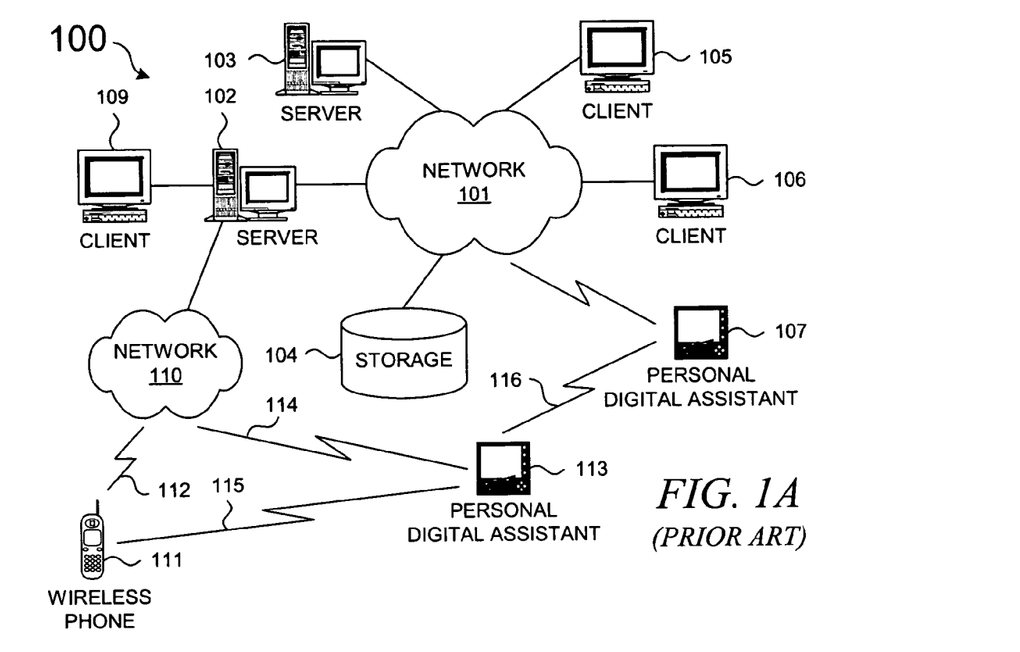
FIG. 1A depicts a typical network of data processing systems, each of which may implement the present invention.

With reference now to the figures, FIG. 1A depicts a typical network of data processing systems, each of which may implement a portion of the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks (PAN) or personal ad-hoc networks. In a similar manner, PDA 113 can transfer data to PDA 107 via wireless communication link 116.

The present invention could be implemented on a variety of hardware platforms; FIG. 1A is intended as an example of a heterogeneous computing environment and not as an architectural limitation for the present invention.

Figure 1B:
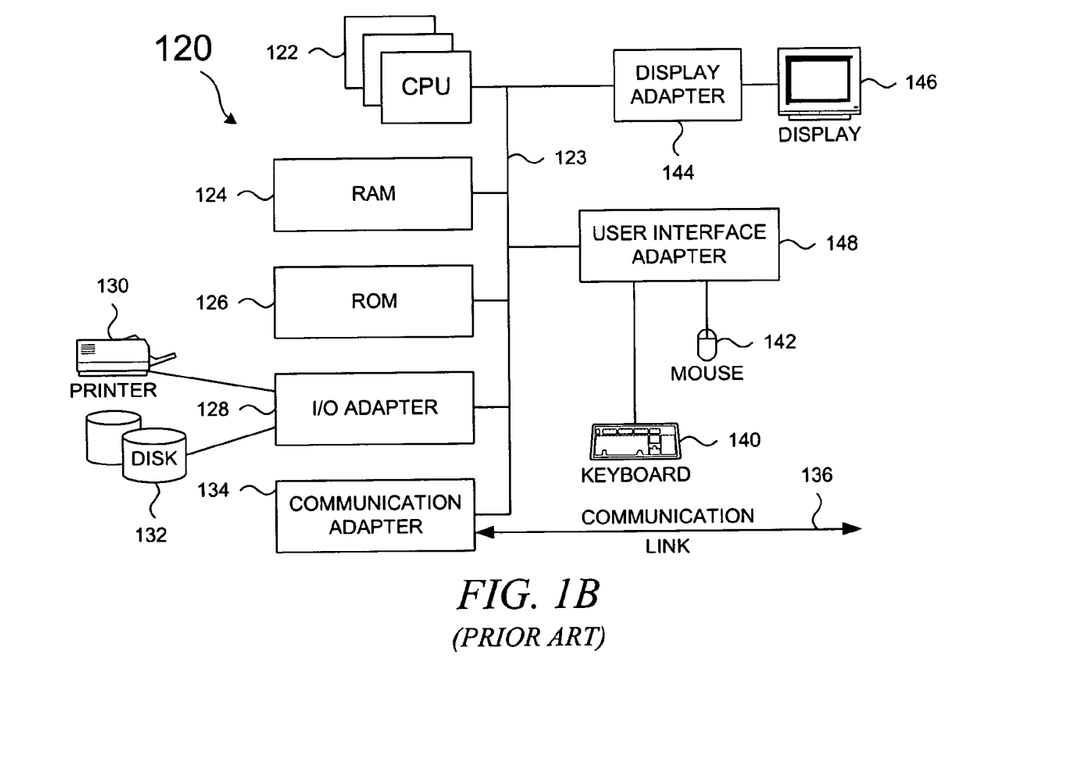
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as an audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files.

The present invention may be implemented on a variety of hardware and software platforms, as described above with respect to FIG. 1A and FIG. 1B. More specifically, though, the present invention is directed to an improved authentication service. Prior to describing the improved authentication service in more detail, a typical authentication service is described.

The descriptions of the figures herein involve certain actions by either a client device or a user of the client device. One of ordinary skill in the art would understand that responses and/or requests to/from the client are sometimes initiated by a user and at other times are initiated automatically by a client, often on behalf of a user of the client. Hence, when a client or a user of a client is mentioned in the description of the figures, it should be understood that the terms "client" and "user" can be used interchangeably without significantly affecting the meaning of the described processes.

Figure 1C:
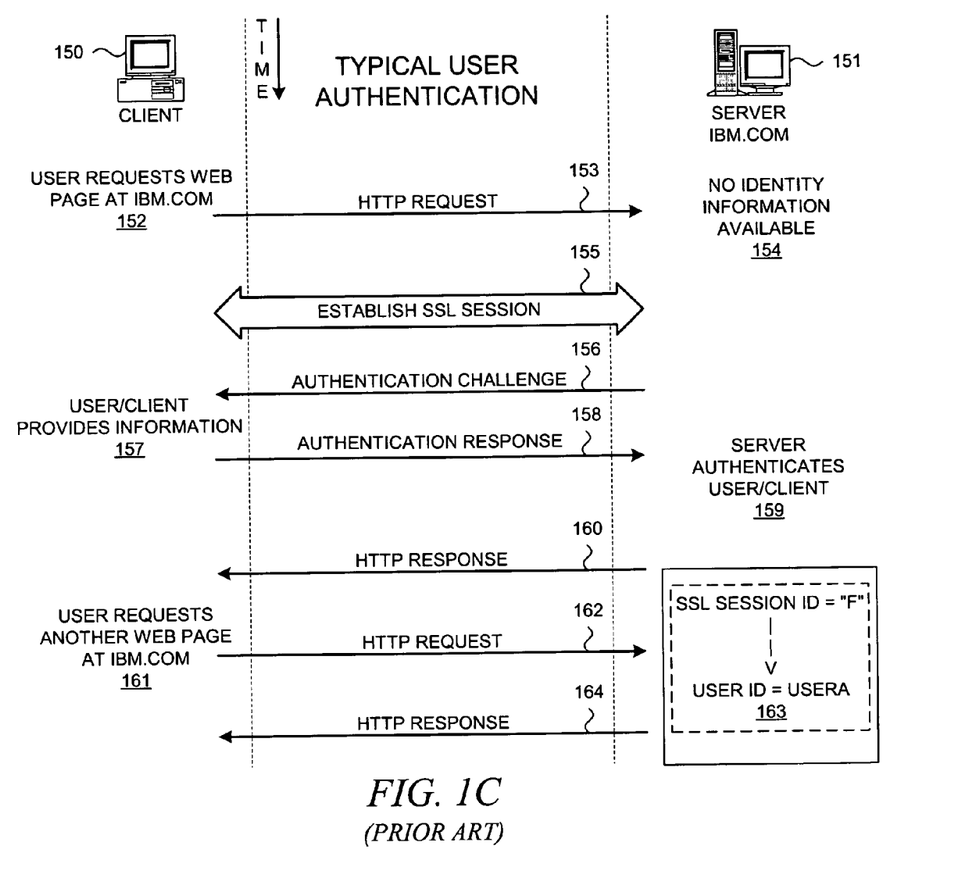
FIG. 1C depicts a data flow diagram that illustrates a typical authentication process that may be used when a client attempts to access a protected resource at a server.

With reference now to FIG. 1C, a data flow diagram illustrates a typical authentication process that may be used when a client attempts to access a protected resource at a server. As illustrated, the user at a client workstation 150 seeks access over a computer network to a protected resource on a server 151 through the user's web browser executing on the client workstation. A protected resource is a resource (an application, an object, a document, a page, a file, executable code, or other computational resource, communication-type resource, etc.) for which access is controlled or restricted. A protected resource is identified by a Uniform Resource Locator (URL), or more generally, a Uniform Resource Identifier (URI), that can only be accessed by an authenticated and authorized user.

The computer network may be the Internet, an intranet, or other network, as shown in FIG. 1A or FIG. 1B, and the server may be a web application server (WAS), a server application, a servlet process, or the like.

The process is initiated when the user requests a server-side protected resource, such as a web page within the domain "ibm.com" (step 152). The terms "server-side" and "client-side" refer to actions or entities at a server or a client, respectively, within a networked environment. The web browser (or associated application or applet) generates an HTTP request (step 153) that is sent to the web server that is hosting the domain "ibm.com". The terms "request" and "response" should be understood to comprise data formatting that is appropriate for the transfer of information that is involved in a particular operation, such as messages, communication protocol information, or other associated information.

The server determines that it does not have an active session for the client (step 154), so the server initiates and completes the establishment of an SSL (Secure Sockets Layer) session between the server and the client (step 155), which entails multiple transfers of information between the client and the server. After an SSL session is established, subsequent communication messages are transferred within the SSL session; any secret information remains secure because of the encrypted communication messages within the SSL session.

However, the server needs to determine the identity of the user before allowing the user to have access to protected resources, so the server requires the user to perform an authentication process by sending the client some type of authentication challenge (step 156). The authentication challenge may be in various formats, such as an HTML form. The user then provides the requested or required information (step 157), such as a username or other type of user identifier along with an associated password or other form of secret information.

The authentication response information is sent to the server (step 158), at which point the server authenticates the user or client (step 159), e.g., by retrieving previously submitted registration information and matching the presented authentication information with the user's stored information. Assuming the authentication is successful, an active session is established for the authenticated user or client.

The server then retrieves the originally requested web page and sends an HTTP response message to the client (step 160), thereby fulfilling the user's original request for the protected resource. At that point, the user may request another page within "ibm.com" (step 161) by clicking a hypertext link within a browser window, and the browser sends another HTTP request message to the server (step 162). At that point, the server recognizes that the user has an active session (step 163), and the server sends the requested web page back to the client in another HTTP response message (step 164).

Figure 1D:
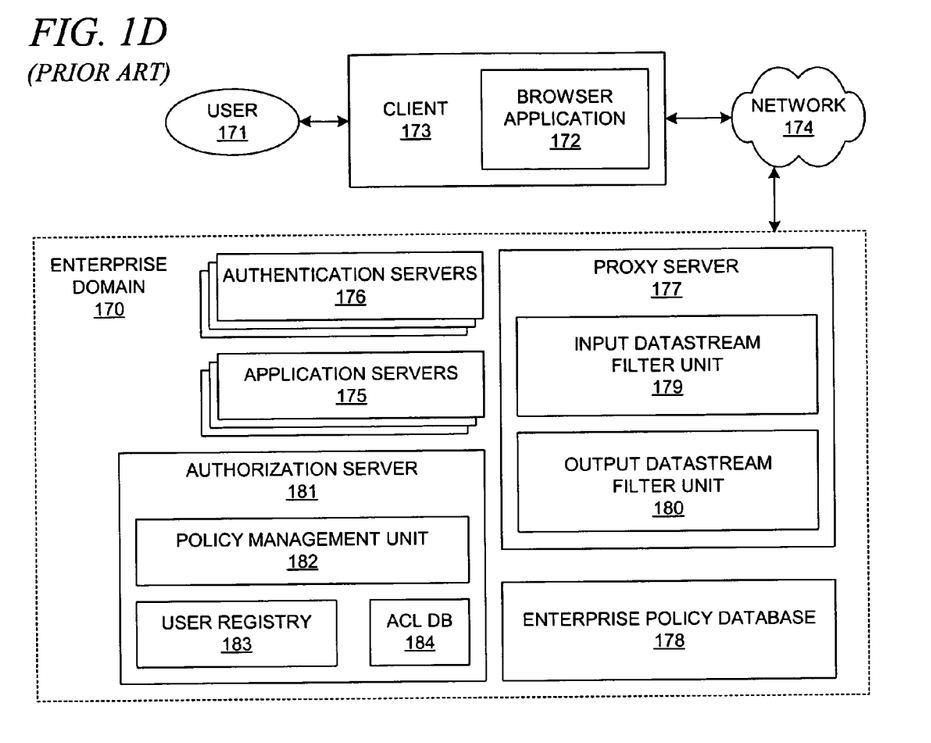
FIG. 1D depicts a block diagram that shows a typical data processing system for an enterprise domain that comprises multiple authentication servers.

With reference now to FIG. 1D, a block diagram depicts a typical data processing system for an enterprise domain that comprises multiple authentication servers. As in a typical corporate computing environment or an Internet-based computing environment, enterprise domain 170 hosts controlled resources that user 171 can access, e.g., by using browser application 172 on client device 173 through network 174. Application servers 175 support accessible resources through web-based applications or other types of applications, including legacy applications. Authentication servers 176 support various authentication mechanisms, such as username/password, X.509 certificates, or secure tokens.

Enterprise domain 170 supports multiple servers. Proxy server 177 performs a wide range of functions for enterprise domain 170. Proxy server 177 can be administratively configured through configuration files and enterprise policy database 178 to control the functionality of proxy server 177, e.g., caching web pages in order to mirror the content from an application server or filtering the incoming and outgoing datastreams through input datastream filter unit 179 and output datastream filter unit 180. Input datastream filter unit 179 may perform multiple checks on incoming requests while output datastream filter unit 180 may perform multiple checks on outgoing responses; each check may be performed in accordance with goals and conditions that are specified within various enterprise policies.

Enterprise domain 170 comprises authorization server 181. Authorization policy management unit 182 at authorization server 181 manages information within user registry 183 and access control list (ACL) database 184. Policy management unit 182 determines whether users are authorized to access certain services that are provided by application servers 175 within domain 170 by checking policies against user requests for those services. It should be noted that the examples herein assume that a user is authorized to access all controlled resources after the user has been authenticated, but various embodiments of the present invention may incorporate alternative authorization processes without affecting the scope of the present invention.

The above-noted entities within enterprise domain 170 represent typical entities within many computing environments. As was shown with respect to FIG. 1C, web-based applications can utilize various means to prompt users to enter authentication information, often as a username/password combination within an HTML form. In the example that is shown in FIG. 1D, user 171 may be required to be authenticated before client 173 may have access to resources, after which a session is established for client 173 in a manner similar to that described above in FIG. 1C. In FIG. 1D, after receiving an incoming request from client 173, input datastream filter unit 179 may determine whether client 173 has already established a session; if not, an authentication service on authentication servers 176 can be invoked in order to authenticate user 171. If client 173 has already established a session, then additional checks may be performed on an incoming request prior to granting access to a controlled resource; the additional checks may be specified in an enterprise authentication policy.

Turning now to focus on the present invention, it was noted above that some systems need to perform a step-up authentication procedure. However, it was also noted that the operation of stepping up from a lower-level, non-certificate-based, authentication procedure to a higher-level, certificate-based, authentication procedure is not possible while maintaining an active mutually authenticated SSL session between the authentication service and a user's browser or similar client application, wherein the SSL session was established between the client and the server for the lower-level, non-certificate-based, authentication procedure, such as a username/password combination. The present invention provides a solution to this problem by having a server-side authentication service perform a certificate-based authentication procedure for the user or the user's client device through an existing SSL session. The present invention is described in more detail below with respect to the remaining figures.

Figure 2:
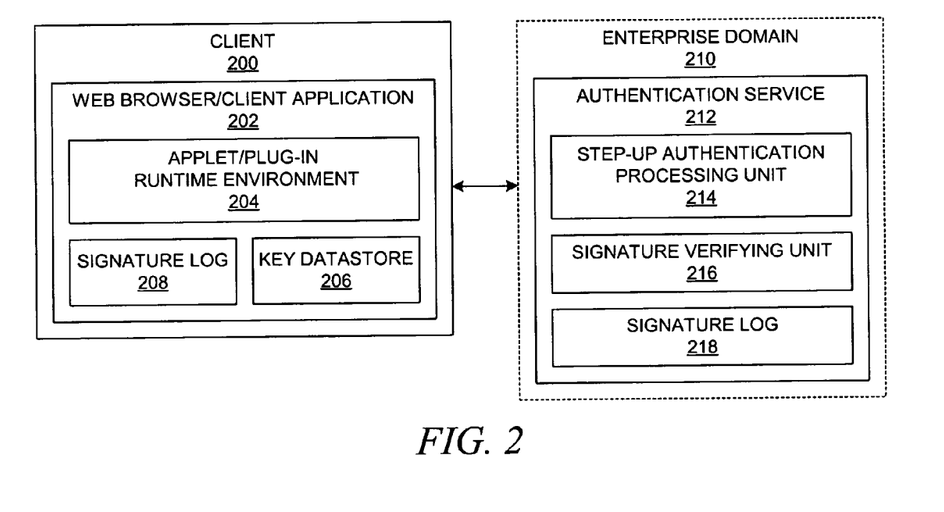
FIG. 2 depicts a block diagram that shows an authentication service that has been extended to include step-up authentication processing in accordance with the present invention.

With reference now to FIG. 2, a block diagram depicts an authentication service that has been extended to include step-up authentication processing in accordance with the present invention. In a manner similar to that described above with respect to FIG. 1D, client 200 executes web browser application 202 or a similar client application for accessing resources and services from various web applications. Browser 202 supports runtime environment 204, which may comprise a virtual machine; runtime environment 204 may execute various types of downloadable, executable, software modules, such as applets or plug-ins. Browser 202 and supported applets/plug-ins can access key datastore 206 in which the client maintains the user's digital certificates and/or cryptographic keys. In addition, browser 202 and supported executable modules can access signature log 208, which contains a log of the signatures that have been generated at client 200. Signature log 208 may also contain signature records/receipts that have been returned from web servers in response to the submission of signatures from client 200.

Domain 210 comprises application servers and authentication servers, at least one of which supports authentication service 212, which includes step-up authentication processing unit 214 for implementing the step-up authentication functionality of the present invention. Authentication service 212 also supports digital signature verifying unit 216 for verifying digital signatures that are received from clients and signature log 218 for storing records of the received signatures that have been returned from clients in response to a requirement from authentication service 212, as explained in more detail below.

Figure 3:
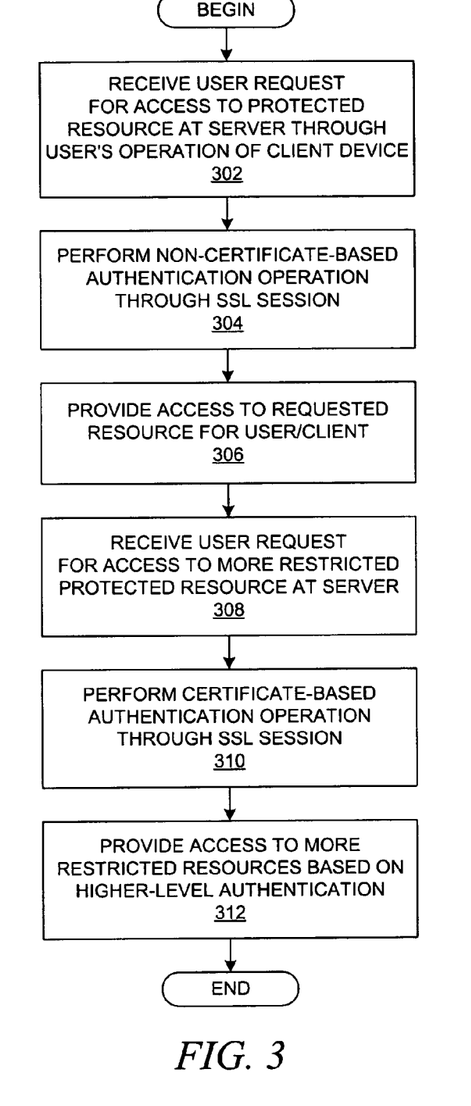
FIG. 3 depicts a flowchart that shows a process for stepping up from a lower-level, non-certificate-based, authentication procedure to a higher-level, certificate-based, authentication procedure while maintaining an active, mutually authenticated, SSL session.

With reference now to FIG. 3, a flowchart depicts a process for stepping up from a lower-level, non-certificate-based, authentication procedure to a higher-level, certificate-based, authentication procedure while maintaining an active, mutually authenticated, SSL session. As described above with respect to FIG. 1C, a typical non-certificate-based authentication operation may occur at a server in response to receiving a user's request for access to a protected resource (step 302), e.g., as a result of a web page request in the form of an HTTP request message that was generated in response to a user action in a browser application on a client device. After establishing a mutually authenticated SSL session between the client and the server, the server performs a non-certificate-based authentication operation through the SSL session (step 304), e.g., a challenge to the client/user to provide a valid username/password combination or some other secret information. Assuming that the non-certificate-based authentication operation is completed successfully, then the server provides the originally requested resource to the client (step 306), e.g., by returning a response message or performing some other action.

FIG. 3 differs from FIG. 1C, though, in that FIG. 1C only illustrates a non-certificate-based authentication operation, whereas FIG. 3 continues by illustrating the manner in which the present invention provides a process for stepping up to a higher-level of security as provided by a certificate-based authentication operation.

At some point in time after the non-certificate-based authentication operation has been completed and the server has provided protected resources during a client session that is secured by the previous non-certificate-based authentication operation, the server receives a request for a protected resource that is controlled by a higher-level of security (step 308), i.e. access to that particular resource is more restricted. In response, the server performs a certificate-based authentication operation for the client through the previously established SSL session between the server and the client (step 310); this is accomplished without breaking the current SSL session, renegotiating the current SSL session, or exiting the current SSL session. Assuming that the certificate-based authentication operation is completed successfully, then the server provides the more restricted resource to the client (step 312), e.g., by returning a response message or performing some other action, and the process is concluded. In this manner, the certificate-based authentication operation occurs through the same SSL session as was previously used for the non-certificate-based authentication operation.

It should be noted that the use of the term "non-certificate-based authentication operation" refers to the fact that the first authentication operation for determining the identity of the user/client does not employ a digital certificate. The use of a client-side digital certificate for establishing an SSL session (which may be used in order to securely transmit secret information that is employed in the non-certificate-based authentication operation, e.g., a password) is not regarded herein as the use of a certificate in a non-certificate-based authentication operation.

Figure 4:
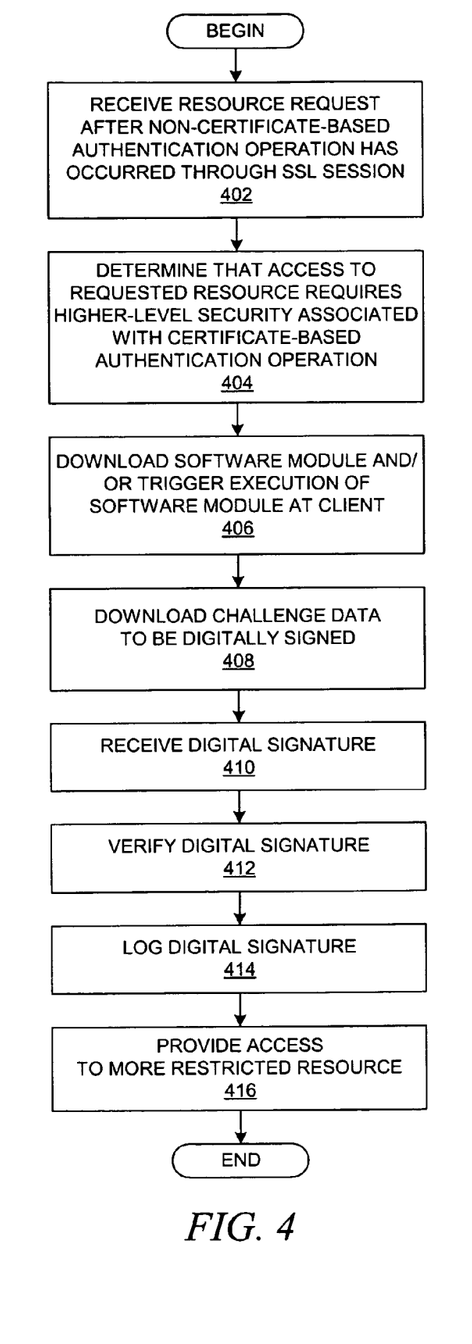
FIG. 4 depicts a flowchart that illustrates further detail of a particular process at a server for the step-up certificate-based authentication operation in accordance with an embodiment of the present invention.

With reference now to FIG. 4, a flowchart depicts further detail of a particular process at a server for the step-up certificate-based authentication operation in accordance with an embodiment of the present invention. The process that is shown in FIG. 4 primarily provides more detail for steps 308-312 in FIG. 3. The steps in the process of FIG. 4 occur within a server-side data processing system, e.g., a system similar to the distributed data processing system that is shown in FIG. 2; for ease of description, the process is described as if the entire process occurs within one server, although the process could be implemented across multiple servers, applications, and/or devices. Although the examples describe the use of HTTP messages and HTML pages, the present invention may be implemented to support other protocols and message/document formats.

The process begins with a server that receives a resource request from a client after a non-certificate-based authentication operation has occurred through an SSL session (step 402), e.g., the non-certificate-based authentication operation as shown in steps 302-306 in FIG. 3. Hence, the server recognizes that the resource request has been received from a client that has already established an active session with the server, and in contrast to FIG. 1C, the server proceeds to respond to the request rather than immediately challenging the client to complete an authentication operation.

The server then determines that access to the requested resource requires a higher-level of security that can be provided by a certificate-based authentication operation rather than a lower-level of security that was provided by the non-certificate-based authentication operation that has been previously completed with the client (step 404). The server may perform this determination through a variety of processes without affecting the scope of the present invention. As one example, the incoming resource request may be filtered or scanned by a proxy server, such as server 177 in FIG. 2. After extracting the requested URI from the incoming request message, the extracted URI is matched with a policy that is associated with the extracted URI. The associated policy indicates the appropriate actions that should be performed to appropriately respond to the URI, including any authentication requirements or other security procedures. If the policy indicates that a certificate-based authentication operation must be successfully completed prior to responding to the request, and if a certificate-based authentication operation has not yet been completed with the requesting client, then a procedure for stepping up the level of authentication is initiated, as shown in the remaining steps of the process shown in FIG. 4. In this example, the application server is not aware that of the authentication requirements, although other embodiments may involve an application server in some manner without affecting the scope of the invention.

The server then proceeds to download a software module from the server to the client and/or to trigger execution of a software module at the client (step 406). The manner in which the software module is downloaded or triggered for execution may vary. In a first embodiment, the server downloads an applet or a plug-in to a client application, such as a browser, e.g., by embedding a Java applet within an HTML web page that is returned as the content payload of an HTTP response message for the original request from the client, i.e. the request that has been determined to require a certificate-based authentication operation. In response, the browser loads the applet as part of its normal interpretation and processing of web pages.

In an alternative embodiment, the server may return a message body to the client that indicates that it contains content having a particular MIME-type (Multipurpose Internet Mail Extension). In response, a browser application at the client loads an appropriate plug-in that has been previously registered with the browser as being able to process the particular MIME-type. In some cases, the browser prompts the user to find an appropriate plug-in if one is not registered for the particular MIME-type. In this manner, the browser may already have a software module that is capable of performing the processing steps that are described hereinbelow such that the server is not required to download a software module to the client.

In any case, the client application that sends the request for the protected resource is also maintaining the previously activated SSL session, and the server sends an appropriate message through the SSL session to the client application to cause the client application to execute a software module that will perform the client-side steps for the certificate-based authentication procedure; in some cases, the server may also download the software module, and in other cases, the software module may already be present at the client. Since the present invention adheres to standard Internet-related protocols and specifications, the present invention provides a manner of step-up authentication operation without assuming that the client application has built-in functionality for responding to the server-side authentication requirements. The server is able to provide a software module with the required functionality by taking advantage of the extensibility of browsers and similar client applications through well-known Internet-related and World-Wide-Web-related technology.

Continuing with FIG. 4, the server then downloads challenge data that is to be digitally signed by the software module (step 408). The challenge data is some type of data item that can be used as input to a digital signature algorithm within the applet, plug-in, or other software module at the client, which generates a digital signature over the challenge data. The format of the challenge data may depend on the digital signature algorithm that is employed, and the present invention may support one or more standard or proprietary digital signature algorithms.

The server may download the challenge data along with a downloaded applet, or the challenge data may be sent in a subsequent message. Alternatively, the applet, plug-in, or other software module at the client may request the challenge data, and the server returns the challenge data in response. Alternatively, the client may already have the challenge data, e.g., a cached web page that was previously returned by the server to the client.

At some subsequent point in time, the server receives a digital signature from the client (step 410), and the server verifies the digital signature with the appropriate public key certificate of the user/client (step 412). The server may retrieve the public key certificate from a directory, or the public key certificate may accompany the message with the digital signature from the client; the authenticity of the public key certificate is verifiable through a certificate authority and various certificate revocation mechanisms. If the digital signature is verified, then the client has shown that it possesses the private key that corresponds to the public key in an asymmetric public/private cryptographic key pair, thereby establishing the identity of the client/user because only the person/entity that is indicated in the valid public key certificate should possess a private key that corresponds to the public key.

Assuming that the digital signature is successfully verified, then the server may log the receipt of the digital signature for non-repudiation purposes (step 414), e.g., by generating a database record with a copy of the digital signature, a verifiable timestamp, and the IP address from which the digital signature was received. The successful verification of the digital signature completes the certificate-based authentication operation, and as a result, the server provides access to the resource that was requested by the client prior to the server attempting the certificate-based authentication operation (step 416), thereby concluding the process that is shown in FIG. 4.

Figure 5:
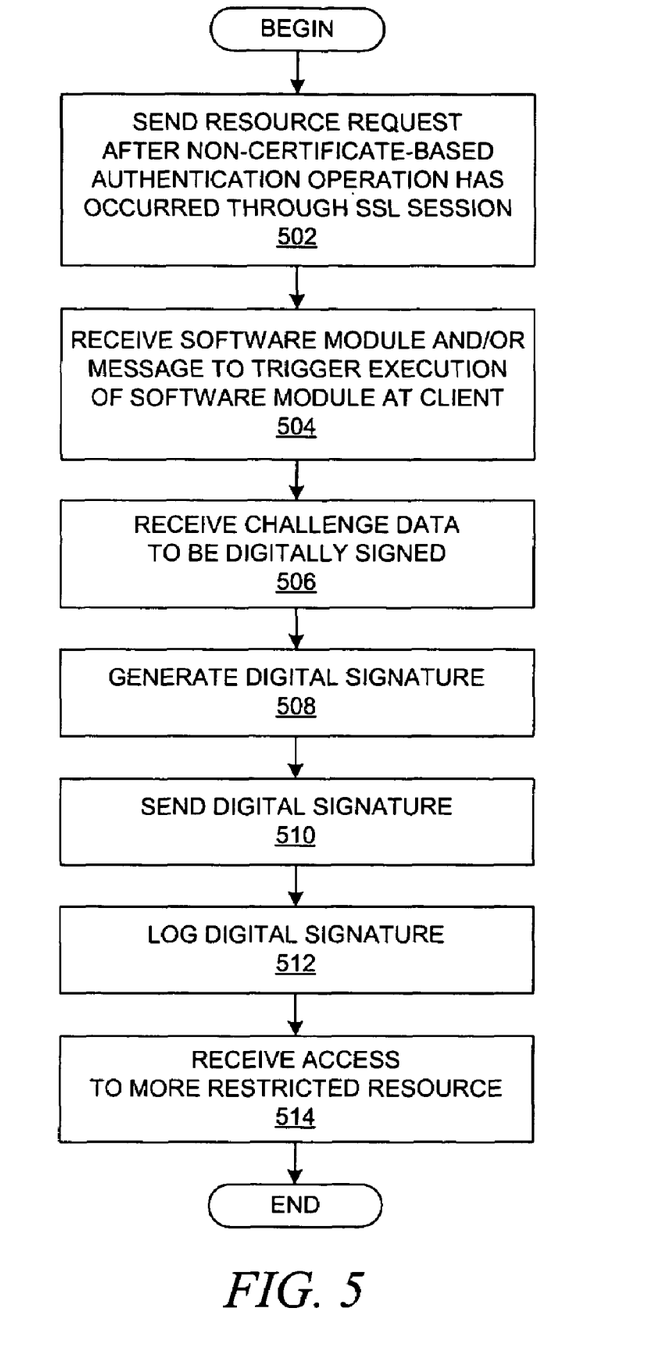
FIG. 5 depicts a flowchart that illustrates the process at a client for the step-up certificate-based authentication operation in accordance with an embodiment of the present invention.

With reference now to FIG. 5, a flowchart depicts a process at a client for the step-up certificate-based authentication operation in accordance with an embodiment of the present invention. In contrast to FIG. 4, which depicts the server-side processing, FIG. 5 depicts the client-side processing. The processing begins with the client sending a request message for a resource to a server after the client has already established an SSL session with the server and has already successfully completed a non-certificate-based authentication operation with the server (step 502). In response to the request, the client receives a response message either that contains a software module or that triggers the execution of a software module that supports a certificate-based authentication operation (step 504). The client may receive an applet, such as a Java applet, that is executable within a virtual machine that is supported by a client application, such as a browser. Alternatively, the client may receive a message that contains content of a particular MIME-type, thereby triggering the client application to launch a plug-in that processes objects having the indicated MIME-type.

In addition, the client application may receive challenge data that is to be used when generating a digital signature (step 506). Alternatively, the client application may already have a data item that may be used as the input to a digital signature algorithm. In any case, the input data to the digital signature algorithm that is used by the client must be known to the server in order for the server to verify the digital signature that is generated over the input data. Hence, the input data to the digital signature algorithm may be chosen by the client and subsequently communicated to the server, e.g., along with the generated digital signature through the SSL session.

At some subsequent point in time after being triggered to generate the digital signature or after determining to generate the digital signature, the client application generates the digital signature (step 508) and sends the digital signature to the server (step 510). In addition, the client application may log the generation of the digital signature (step 512) along with a timestamp and possibly other information that may assist in a non-repudiation procedure. Assuming that the digital signature was generated properly, the client has successfully completed the step-up certificate-based authentication operation through the previously established SSL session, and the client then receives access to the requested resource (step 514), e.g., by receiving a web page, thereby concluding the client-side process.

The manner in which the digital signature is generated and verified may vary in accordance with well-known standards or proprietary processes without affecting the scope of the present invention. For example, the client-side process may occur when a browser at a client receives an HTML page with an embedded applet in response to the server's determination to perform a step-up certificate-based authentication process through a previously established SSL session. The browser processes the web page and executes the applet, which might prompt the user to input the identifier of a key datastore, such as a file on the client, along with a password to unlock the key datastore. The mechanism by which the applet prompts the user or otherwise operates may vary depending upon the implementation of the invention. The applet may prompt the user by presenting a web page within the browser window that explains the need to produce a digital signature for the pending request, and the presented web page may have an OK button and a CANCEL button that allows the user to approve or disapprove the request for the digital signature. In addition, the presented web page may echo the challenge data that is being signed so that the user may review the challenge data.

Typically, the key datastore holds a private key of a private/public key pair for asymmetric cryptographic functions. The key datastore may be managed by various entities, such as the browser application, the applet, or the client operating system. The browser may adhere to various standards regarding the use of cryptographic information. For example, "PKCS #7: Cryptographic Message Syntax", RFC (Request for Comments) 2315, Internet Engineering Task Force (IETF), is a PKCS (Public Key Cryptographic System) specification that describes a general syntax for data that may have cryptography applied to the data, such as digital signatures and digital envelopes. As another example, "PKCS #11: Cryptographic Token Interface Standard", RSA Security, Inc., is a PKCS specification that describes an application programming interface (API) for devices that hold cryptographic information and perform cryptographic functions.

After the user has entered the requested information and indicated that the user approves the use of the user's private key, the applet generates a digital signature, preferably in the form of an XML digital signature as standardized by the World Wide Web Consortium (W3C). The digital signature is created by applying an appropriate signing algorithm to the set of data items that are to be subsequently verified, i.e., the so-called "signed info"; in this scenario, the data that is signed would minimally include the challenge data. An XML signature also includes so called "key info", which may include the user's public key certificate that should be used to verify the digital signature. The applet then sends the XML signature to the web server, and the process of generating the digital signature is complete.

The advantages of the present invention should be apparent in view of the detailed description that is provided above. The present invention provides an authentication operation for stepping up from a lower-level, non-certificate-based, authentication procedure to a higher-level, certificate-based, authentication procedure while maintaining an active mutually authenticated SSL session between an authentication service and a user's browser or similar client application, wherein the SSL session was established between the client and the server for the lower-level, non-certificate-based, authentication procedure, such as a username/password combination.

The present invention provides a solution to this problem by having a server-side authentication service perform a certificate-based authentication procedure for the user or the user's client device through an existing SSL session. The authentication service downloads an executable module to the client through an existing SSL session, if necessary. The executable module then generates a digital signature using a client-side digital certificate, and the digital signature is returned through the previously established SSL session. The certificate-based authentication procedure is completed after the authentication service verifies the digital signature. In this manner, the authentication service can step-up to certificate-based authentication without needing to exit or renegotiate an existing SSL session.

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for performing authentication operations, the method comprising:

performing a non-certificate-based authentication operation through an SSL (Secure Sockets Layer) session between a server and a client; and subsequent to performing the non-certificate-based authentication operation, performing a certificate-based authentication operation through the SSL session between the server and the client without exiting or renegotiating the SSL session prior to completion of the certificate-based authentication operation, wherein the non-certificate-based authentication operation through the SSL session uses a first digital certificate from the client, wherein the certificate-based authentication operation uses a second digital certificate from the client, and wherein the first digital certificate and the second digital certificate are not identical.

2. The method of claim 1 further comprising:
providing access to a first resource for a client by a server in association with the non-certificate-based authentication operation.

3. The method of claim 2 wherein the step of providing access to the first resource further comprises:
receiving at the server a first resource request from the client;
in response to determining that the first resource request requires completion of a non-certificate-based authentication operation prior to responding to the first resource request, establishing an SSL (Secure Sockets Layer) session between the server and the client; and
in response to successfully performing the non-certificate-based authentication operation between the server and the client through the SSL session, sending a first resource response from the server to the client.

4. The method of claim 1 further comprising: providing access to a second resource for a client by a server in association with the certificate-based authentication operation.

5. The method of claim 4 wherein the step of providing access for the second resource further comprises:
receiving at the server a second resource request from the client through the SSL session;
in response to determining that the second resource request requires a certificate-based authentication procedure, downloading an executable module to the client from the server through the SSL session;
receiving at the server a digital signature that has been generated by the executable module using a digital certificate at the client; and
in response to successfully verifying the digital signature at the server, sending a second resource response from the server to the client.

6. The method of claim 4 wherein the step of providing access for the second resource further comprises:
receiving at the server a second resource request from the client through the SSL session;
in response to determining that the second resource request requires a certificate-based authentication procedure, triggering execution of a downloadable software module at the client by the server through the SSL session;
receiving at the server a digital signature that has been generated by the execution of the downloadable software module using a digital certificate at the client; and
in response to successfully verifying the digital signature at the server, sending a second resource response from the server to the client.

7. The method of claim 1 further comprising: obtaining access to a second resource at a server by a client in association with the certificate-based authentication operation.

8. The method of claim 7 wherein the step of obtaining access to the second resource further comprises:
sending a second resource request from the client to the server through the SSL session;
receiving an executable module at the client from the server through the SSL session, wherein the executable module comprises functionality for performing a certificate-based authentication operation;
sending to the server through the SSL session a digital signature that has been generated by the executable module using a digital certificate at the client; and
receiving a second resource response from the server at the client.

9. The method of claim 7 wherein the step of obtaining access to the second resource further comprises:
sending a second resource request from the client to the server through the SSL session;
receiving at the client from the server through the SSL session a response message having content with an associated content type indicator;
in response to determining a content type for the content, executing a downloadable software module at the client;
sending to the server through the SSL session a digital signature that has been generated by the executable module using a digital certificate at the client; and
receiving a second resource response from the server at the client.

10. A method for performing authentication operations, the method comprising:
receiving at a server a first resource request from a client;
in response to determining that the first resource request requires completion of a non-certificate-based authentication operation prior to responding to the first resource request, establishing an SSL (Secure Sockets Layer) session between the server and the client;
performing a non-certificate-based authentication operation through the SSL session;
in response to successfully performing the non-certificate-based authentication operation, sending a first resource response from the server to the client;
receiving at the server a second resource request from the client through the SSL session subsequent to performing the non-certificate-based authentication operation;
in response to determining that the second resource request requires a certificate-based authentication procedure, downloading an executable module to the client from the server through the SSL session;
receiving at the server through the SSL session a digital signature that has been generated by the executable module using a digital certificate at the client; and
in response to successfully verifying the digital signature at the server, sending a second resource response from the server to the client,
wherein establishing the SSL session uses a first digital certificate from the client, wherein the certificate-based authentication operation uses a second digital certificate from the client, and wherein the first digital certificate and the second digital certificate are not identical.

* * * * *